United States Patent
Lashkari et al.

(10) Patent No.: US 8,838,697 B2
(45) Date of Patent: Sep. 16, 2014

(54) PEER-TO-PEER FILE TRANSFER BETWEEN COMPUTER SYSTEMS AND STORAGE DEVICES

(75) Inventors: Hassan Lashkari, Palo Alto, CA (US); Huy B. Le, Milpitas, CA (US); Daniel R. Borges, San Francisco, CA (US)

(73) Assignee: Apple Inc., Cupertino, CA (US)

(*) Notice: Subject to any disclaimer, the term of this patent is extended or adjusted under 35 U.S.C. 154(b) by 88 days.

(21) Appl. No.: 13/415,664

(22) Filed: Mar. 8, 2012

(65) Prior Publication Data

US 2013/0238711 A1 Sep. 12, 2013

(51) Int. Cl.
*G06F 15/16* (2006.01)
*G06F 3/06* (2006.01)

(52) U.S. Cl.
CPC ............ *G06F 3/0655* (2013.01); *G06F 3/0632* (2013.01)
USPC .............................. 709/205; 709/211; 710/13

(58) Field of Classification Search
CPC ... G06F 3/0655; G06F 3/0629; G06F 3/0631; G06F 3/0632; G06F 3/0679; Y02B 60/1246
USPC ........ 709/200–205, 217–227, 211; 710/2, 13, 710/15, 19, 301, 302
See application file for complete search history.

(56) References Cited

U.S. PATENT DOCUMENTS

| | | | |
|---|---|---|---|
| 6,772,233 B2* | 8/2004 | Iida et al. | 710/13 |
| 6,831,444 B2* | 12/2004 | Kobayashi et al. | 320/136 |
| 7,401,741 B2* | 7/2008 | Thayer | 235/492 |
| 7,849,267 B2* | 12/2010 | Lam et al. | 711/115 |
| 2003/0045327 A1* | 3/2003 | Kobayashi et al. | 455/557 |
| 2003/0141849 A1* | 7/2003 | Kobayashi et al. | 320/136 |
| 2004/0023683 A1* | 2/2004 | Mizuhiki et al. | 455/550.1 |
| 2005/0235042 A1* | 10/2005 | Rumaner et al. | 709/216 |
| 2010/0169548 A1* | 7/2010 | Kanda | 711/103 |
| 2011/0093958 A1* | 4/2011 | Devictor | 726/26 |
| 2011/0131660 A1* | 6/2011 | Claessen et al. | 726/26 |

* cited by examiner

*Primary Examiner* — Moustafa M Meky
(74) *Attorney, Agent, or Firm* — Park, Vaughan, Fleming & Dowler LLP; Chia-Hsin Suen (57) ABSTRACT

The disclosed embodiments provide a system that facilitates communication with a storage device. During operation, the system provides a physically operated mechanism for enabling detection of the storage device in proximity to a computer system using a discovery protocol. If detection of the storage device using the discovery protocol is enabled, the system uses the physically operated mechanism to establish a wireless peer-to-peer connection between the storage device and the computer system. The system then uses the wireless peer-to-peer connection to transfer a file between the storage device and the computer system.

19 Claims, 6 Drawing Sheets

PEER-TO-PEER FILE TRANSFER BETWEEN COMPUTER SYSTEMS AND STORAGE DEVICES

BACKGROUND

1. Field

The disclosed embodiments relate to storage devices for computer systems. More specifically, the disclosed embodiments relate to techniques for enabling wireless peer-to-peer file transfer between storage devices and computer systems.

2. Related Art

Recent improvements in computing power and wireless networking technology have significantly increased the capabilities of portable computing devices, such as laptop computers, tablet computers, portable media players and smartphones. These portable computing devices typically include a number of bus interfaces, such as Universal Serial Bus (USB) interfaces, which can be used to connect the portable computing device to various peripheral devices, such as non-volatile storage devices, I/O devices, network devices, printers, power adapters, and even other computer systems.

Technological advances have also produced smaller form factors for the portable computing devices. Such form factors may enhance the portability of the portable computing devices but may also reduce the number of physical bus interfaces available on the devices. For example, the available USB ports on a laptop computer may be occupied by a keyboard and mouse. As a result, other USB devices such as external hard drives, printers, and/or digital cameras may be connected to the laptop computer only after the keyboard and/or mouse are unplugged. In other words, use of portable computing devices with peripheral devices may be negatively impacted by the limited number of physical ports on the portable computing devices.

Hence, what is needed is a mechanism for enabling communication between a portable electronic device and a peripheral device without requiring the use of a physical connection between the portable electronic device and the peripheral device.

SUMMARY

The disclosed embodiments provide a system that facilitates communication with a storage device. During operation, the system provides a physically operated mechanism for enabling detection of the storage device in proximity to a computer system using a discovery protocol. If detection of the storage device using the discovery protocol is enabled, the system uses the physically operated mechanism to establish a wireless peer-to-peer connection between the storage device and the computer system. The system then uses the wireless peer-to-peer connection to transfer a file between the storage device and the computer system.

In some embodiments, the system also uses an infrastructure connection to transfer the file between the storage device and the computer system if the infrastructure connection is more robust than the wireless peer-to-peer connection.

In some embodiments, the physically operated mechanism includes a button, a switch, and/or a peripheral device. Detection of the storage device using the discovery protocol may be enabled by pressing the button, toggling the switch, and/or connecting the peripheral device to the storage device.

In some embodiments, the physically operated mechanism also includes a radio, a processor, and a memory. For example, the processor may implement a software stack that enables detection of the storage device by the computer system using the discovery protocol, establishment of the wireless peer-to-peer connection between the storage device and the computer system, and file transfer over the wireless peer-to-peer connection. The software stack may also be stored on the memory, and wireless communications between the storage device and the computer system may be enabled by an 802.11-compliant and/or Bluetooth (Bluetooth™ is a registered trademark of Bluetooth SIG, Inc.) radio.

In some embodiments, enabling detection of the storage device by the computer system using the discovery protocol involves advertising a file-transfer capability of the storage device using the discovery protocol.

In some embodiments, the storage device is at least one of an internal hard disk drive (HDD), an external HDD, a thumb drive, and a memory card.

In some embodiments, the physically operated mechanism is integrated into the storage device or physically connected to the storage device.

In some embodiments, the wireless peer-to-peer connection is initiated upon receiving a request from the computer system to transfer the file. For example, a user may transfer a file from the storage device to the computer system by dragging a file on the storage device to a name and/or icon for the computer system. Similarly, the user may transfer a file from the computer system to the storage device by dragging a file on the computer system to a name and/or icon for the storage device. The dragged file may trigger a request to transfer the file that is sent to the storage device and/or computer system. Upon receiving the request, the storage device and/or computer system may establish the wireless peer-to-peer connection and use the wireless peer-to-peer connection to transfer the file.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
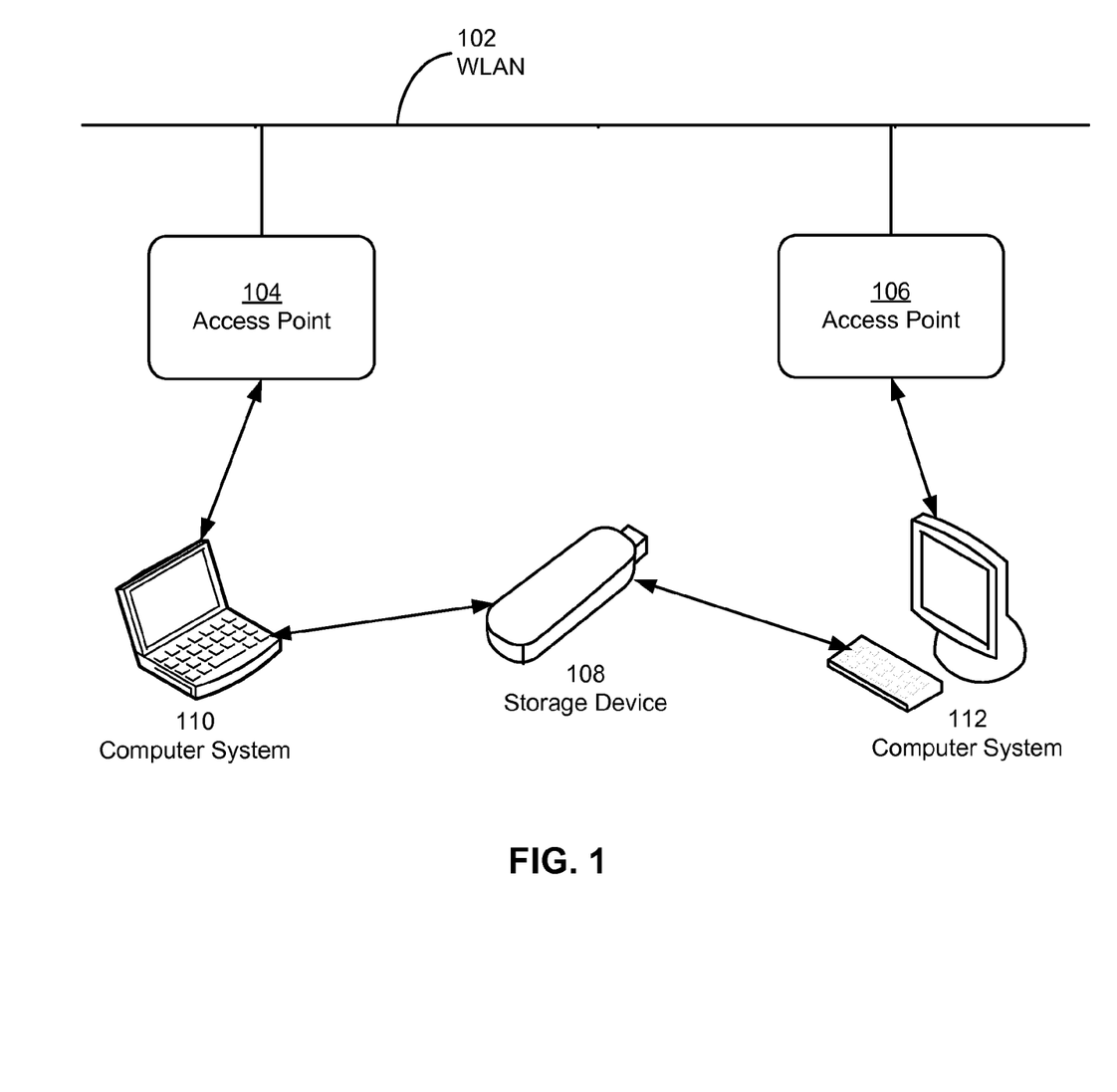
FIG. 1 shows a schematic of a system in accordance with the disclosed embodiments.

The disclosed embodiments provide a method and system for performing a file transfer between a computer system and a storage device. As shown in FIG. 1, two computer systems 110-112 are connected to two access points 104-106 of a wireless local area network (WLAN) 102. Computer systems 110-112 may communicate with one another and/or with other computer systems through WLAN 102. For example, computer systems 110-112 may use WLAN 102 to transfer files, stream audio and/or video, and/or share desktops between one another.

Alternatively, computer systems 110-112 may include functionality to detect one another using a discovery protocol such as Bonjour (Bonjour™ is a registered trademark of Apple Inc.), form a wireless peer-to-peer connection with one another, and transfer files with each other over the wireless peer-to-peer connection. For example, computer system 112 may advertise a file-transfer capability such as AirDrop (AirDrop™ is a registered trademark of Apple Inc.) using the discovery protocol, and computer system 110 may detect computer system 112 using the discovery protocol and display a name and/or icon representing computer system 112 to a user of computer system 110. The user may signal a file transfer from computer system 110 to computer system 112 by dragging a file on computer system 110 to the name and/or icon for computer system 112. The dragged file may trigger the formation of the wireless peer-to-peer connection between computer systems 110-112 and the subsequent transfer of the file over the wireless peer-to-peer connection. In other words, computer systems 110-112 may include functionality to perform ad hoc wireless peer-to-peer file transfers with one another.

Computer systems 110-112 may also perform file transfers using a storage device 108 such as an external hard disk drive (HDD), memory card, and/or thumb drive. For example, a user may connect storage device 108 to a Universal Serial Bus (USB) port and/or memory card slot of computer system 110 and copy one or more files from computer system 110 to storage device 108. Next, the user may disconnect storage device 108 from computer system 110, connect storage device 108 to computer system 112, and transfer the copied file(s) from storage device 108 to computer system 112.

As a result, use of storage device 108 with a computer system (e.g., computer systems 110-112) may require a free physical port on the computer system, as well as the manual connection of storage device 108 to the physical port. Connection of storage device 108 to an I/O-constrained computer system such as a laptop computer, tablet computer, mobile phone, and/or portable media player may further require the prior disconnection of another peripheral device from the computer system. For example, a user may unplug a mouse, keyboard, speakers, printer, digital camera, microphone, and/or other peripheral device from a USB port on the computer system to free the USB port for subsequent use with storage device 108. To resume use of the peripheral device with the computer system, the user may have to wait for file transfers between the computer system and storage device 108 to complete, unplug storage device 108 from the computer system, and plug the peripheral device back into the computer system. In other words, file transfers involving storage device 108 may involve significant manual setup and interfere with the use of other peripheral devices on the computer system.

In one or more embodiments, the system of FIG. 1 includes functionality to facilitate use of storage device 108 by performing ad hoc wireless peer-to-peer file transfers between storage device 108 and one or more computer systems 110-112. More specifically, a physically operated mechanism may be physically connected to storage device 108 and/or integrated into storage device 108. The physically operated mechanism may enable detection of storage device 108 in proximity to a computer system (e.g., computer systems 110-112) using a discovery protocol (e.g., Bonjour), establishment of a wireless peer-to-peer connection between storage device 108 and the computer system, and file transfer over the wireless peer-to-peer connection (e.g., using AirDrop). Physically operated mechanisms for enabling peer-to-peer file transfer between storage devices and computer systems are discussed in further detail below with respect to FIGS. 2-4.

Figure 2:
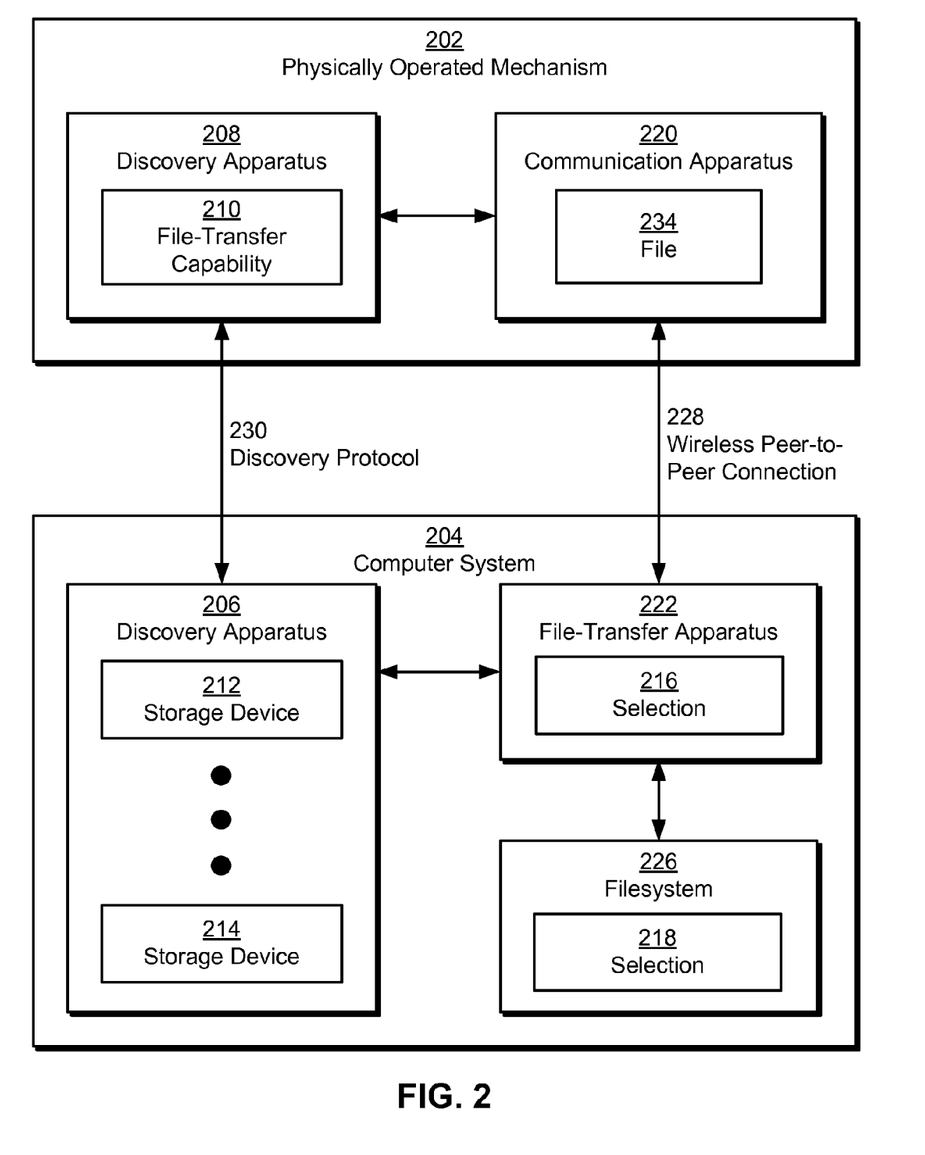
FIG. 2 shows a system for facilitating communication with a storage device in accordance with the disclosed embodiments.

FIG. 2 shows a system for facilitating communication with a storage device in accordance with the disclosed embodiments. The system includes a physically operated mechanism 202 that includes functionality to communicate with a computer system 204 in proximity to the storage device (e.g., storage device 108 of FIG. 1).

As mentioned above, physically operated mechanism 202 may be physically connected to the storage device and/or integrated into the storage device. For example, physically operated mechanism 202 may correspond to a hardware dongle that attaches to a USB connector of an external HDD and/or a physical port of a computer system (e.g., mobile phone, portable media player, personal computer, laptop computer, tablet computer, etc.) with an internal HDD. Conversely, the functionality of physically operated mechanism 202 may be provided by components (e.g., radio, processor, memory, etc.) within the storage device. Use of physically operated mechanisms with and/or within storage devices is discussed in further detail below with respect to FIGS. 3-4.

As shown in FIG. 2, physically operated mechanism 202 may include a discovery apparatus 208 that advertises a file-transfer capability 210 using a discovery protocol 230 such as Bonjour. File-transfer capability 210 may enable the detection of the storage device using discovery protocol 230. In addition, file-transfer capability 210 may be enabled or disabled through user manipulation of physically operated mechanism 202. For example, the user may enable or disable file-transfer capability 210 by pressing a button and/or toggling a switch on physically operated mechanism 202. Alternatively, if physically operated mechanism 202 exists independently from the storage device, the user may enable file-transfer capability 210 by physically connecting (e.g., plugging in) physically operated mechanism 202 to the storage device and disable file-transfer capability 210 by physically disconnecting (e.g., unplugging) physically operated mechanism 202 from the storage device.

A corresponding discovery apparatus 206 in computer system 204 may use discovery protocol 230 to detect one or more nearby storage devices 212-214 associated with file-transfer capability 210, including the storage device associated with (e.g., containing and/or connected to) physically operated mechanism 202. Discovery apparatus 206 may provide storage devices 212-214 to a file-transfer apparatus 222 in computer system 204, and file-transfer apparatus 222 may obtain a selection 216 of the storage device associated with physically operated mechanism 202 from a user of computer system 204.

File-transfer apparatus 222 may then establish a wireless peer-to-peer connection 228 with a communication apparatus 220 in physically operated mechanism 202, obtain a user selection 218 of a file 234 from a filesystem 226 of computer system 204 and/or the storage device, and transfer file 234 over wireless peer-to-peer connection 228. Alternatively, file-transfer apparatus 222 may use an infrastructure connection (not shown) to transfer file 234 if the infrastructure connection is more robust than wireless peer-to-peer connection 228. The recipient of file 234 may then write file 234 to disk and/or other nonvolatile memory.

For example, file-transfer apparatus 222 may provide a graphical user interface (GUI) (e.g., AirDrop interface) that displays a list of names and/or icons associated with storage devices 212-214 to the user of computer system 204. The user may make selections 216-218 by clicking on file 234 within a GUI for filesystem 226 and dragging file 234 to the name and/or icon representing the storage device associated with physically operated mechanism 202. Next, file-transfer apparatus 222 may transmit a request to transfer file 234 to physically operated mechanism 202, and physically operated mechanism 202 may obtain approval of the request from the user of the storage device (e.g., through a button press, etc.) and/or automatically approve the request if computer system 204 is trusted.

Once the request is approved, file-transfer apparatus 222 and communication apparatus 220 may establish wireless peer-to-peer connection 228 using information obtained from discovery protocol 230 and transfer file 234 over wireless peer-to-peer connection 228. File-transfer apparatus 222 and/or communication apparatus 220 may also periodically compare the signal strength of wireless peer-to-peer connection 228 with that of an infrastructure connection from a WLAN (e.g., WLAN 102 of FIG. 1) to which physically operated mechanism 202 and computer system 204 are connected. If the infrastructure connection is associated with a more robust connection (e.g., higher signal strength, more bandwidth, etc.) than wireless peer-to-peer connection 228, file-transfer apparatus 222 and/or communication apparatus 220 may transfer some or all of file 234 over the infrastructure connection instead of wireless peer-to-peer connection 228. If the infrastructure connection is unavailable and/or associated with lower bandwidth and/or signal strength than wireless peer-to-peer connection 228, file-transfer apparatus 222 and/or communication apparatus 220 may continue transferring file 234 over wireless peer-to-peer connection 228 until the transfer is complete.

Consequently, physically operated mechanism 202 may simplify file transfer between computer system 204 and the storage device. In particular, physically operated mechanism 202 may extend wireless ad hoc peer-to-peer file transfer functionality provided by computer systems (e.g., computer system 204) to the storage device, thus enabling file transfer to and/or from the storage device over a wireless peer-to-peer connection instead of a physical (e.g., wired) connection. The lack of a physical connection between computer system 204 and the storage device may additionally simplify and/or streamline the file transfer process and facilitate the use of physical ports on computer system 204 with other peripheral devices, such as keyboards, mice, speakers, microphones, webcams, and/or printers.

Figure 3:
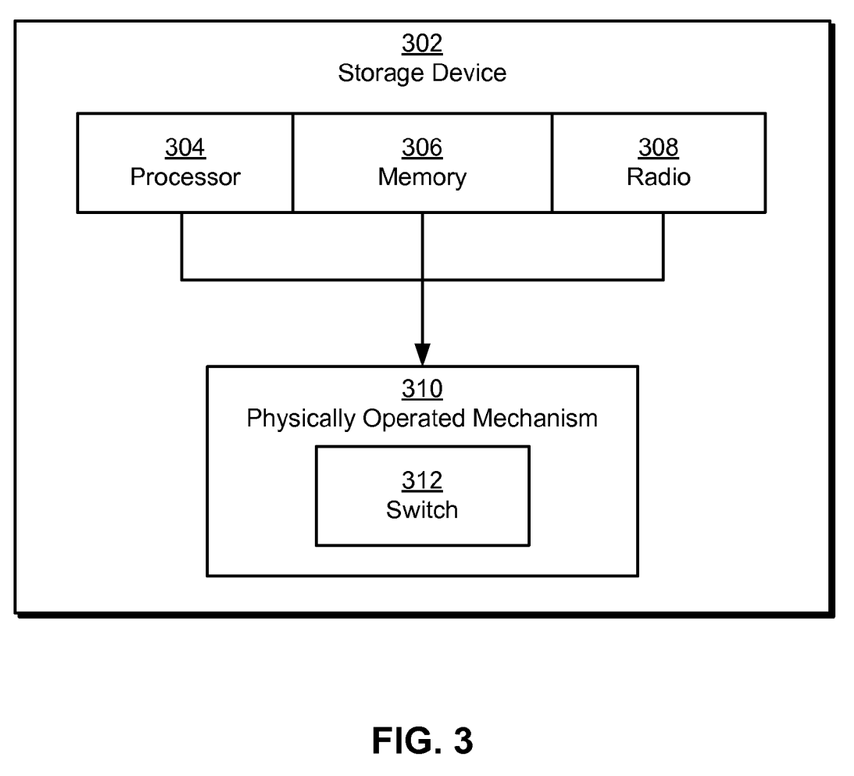
FIG. 3 shows the integration of a physically operated mechanism into a storage device in accordance with the disclosed embodiments.

FIG. 3 shows the integration of a physically operated mechanism 310 into a storage device 302 in accordance with the disclosed embodiments. The functionality of physically operated mechanism 310 may be implemented using a processor 304, memory 306, and radio 308 on storage device 302.

Processor 304 may correspond to a disk and/or NAND controller on an external storage device 302 (e.g., external HDD, thumb drive, memory card, etc.). Processor 304 may implement a software stack that enables detection of storage device 302 in proximity to a computer system using a discovery protocol (e.g., discovery protocol 230 of FIG. 2), establishment of a wireless peer-to-peer connection between storage device 302 and the computer system, and file transfer over the wireless peer-to-peer connection. The software stack may also be stored on memory 306 (e.g., flash chip, hard-disk platter, etc.) in storage device 302, and wireless (e.g., peer-to-peer, WiFi, etc.) communications between storage device 302 and the computer system may be enabled by an 802.11-compliant and/or Bluetooth (Bluetooth™ is a registered trademark of Bluetooth SIG, Inc.) radio 308.

In addition, physically operated mechanism 310 may include a physical switch 312 that enables and disables detection of storage device 302 using the discovery protocol. As described above, such detection of storage device 302 may be enabled or disabled through user manipulation of switch 312. For example, the user may toggle switch 312 from an off-state to an on-state to enable detection of storage device 302 by the computer system using the discovery protocol, as well as subsequent wireless peer-to-peer file transfer between storage device 302 and the computer system. After the file transfer is complete, the user may toggle switch 312 back to the off-state to disable wireless peer-to-peer file transfers to and/or from storage device 302. Alternatively, switch 312 may correspond to a button that is pressed to enable and disable peer-to-peer file transfer functionality in storage device 302.

Figure 4:
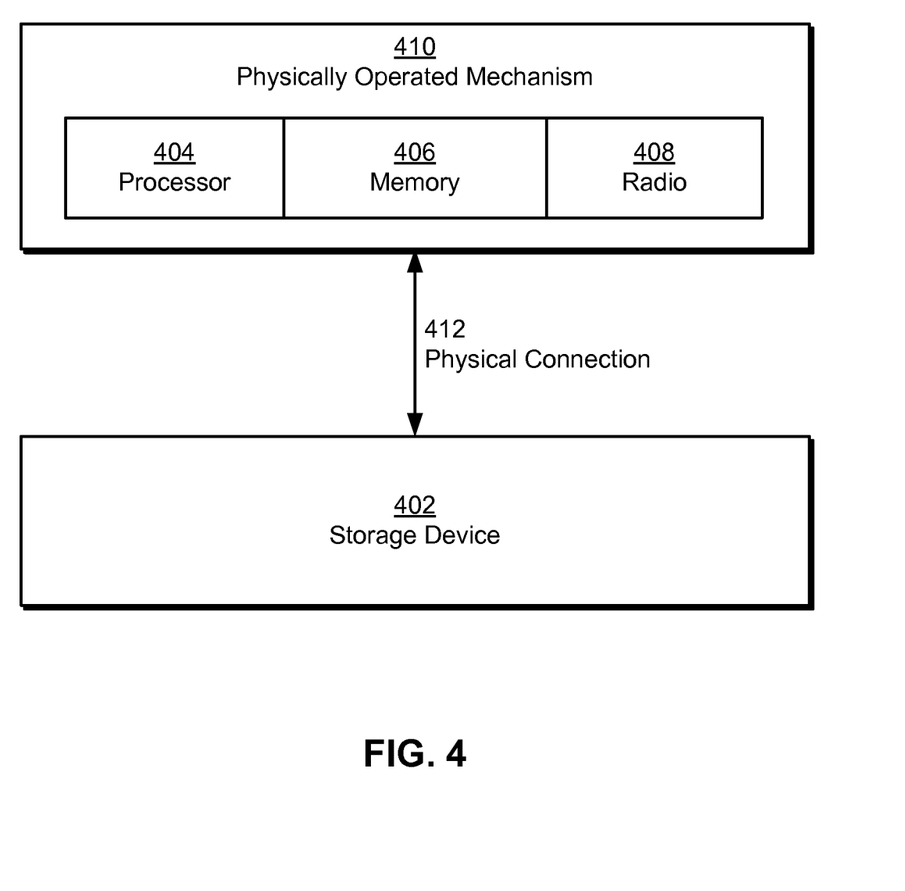
FIG. 4 shows the use of a physically operated mechanism with a storage device in accordance with the disclosed embodiments.

FIG. 4 shows the use of a physically operated mechanism 410 with a storage device 402 in accordance with the disclosed embodiments. Unlike physically operated mechanism 310 of FIG. 3, physically operated mechanism 410 is not integrated into storage device 402. Instead, physically operated mechanism 410 may correspond to a standalone component with a processor 404, memory 406, and radio 408 that provides wireless peer-to-peer file transfer functionality to storage device 402 through a physical connection 412 with storage device 402. For example, physically operated mechanism 410 may correspond to a hardware dongle that plugs into a USB port, memory card slot, and/or other physical connector provided by storage device 402 and/or a computer system containing storage device 402.

Once physically operated mechanism 410 is connected to storage device 402, physically operated mechanism 410 may enable detection of storage device 402 in proximity to a computer system using a discovery protocol, establishment of a wireless peer-to-peer connection between storage device 402 and the computer system, and file transfer over the wireless peer-to-peer connection. For example, physically operated mechanism 410 may enable ad hoc "drag and drop" file transfers to and from a computer system, HDD, memory card, thumb drive, and/or other storage device that does not natively support such file transfers.

Figure 5:
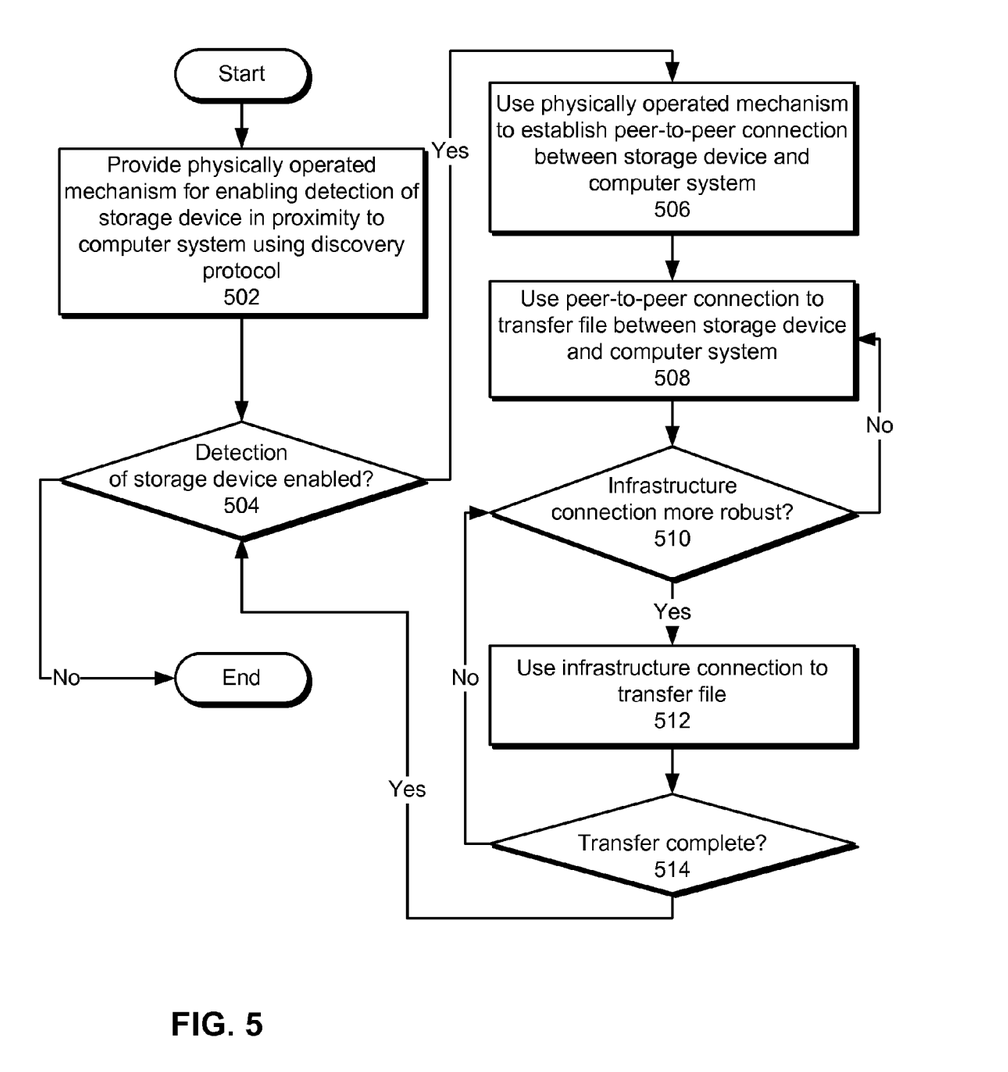
FIG. 5 shows a flowchart illustrating the process of facilitating communication with a storage device in accordance with the disclosed embodiments.

FIG. 5 shows a flowchart illustrating the process of facilitating communication with a storage device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a physically operated mechanism is provided for enabling detection of a storage device in proximity to a computer system using a discovery protocol (operation 502). Detection of the storage device using the discovery protocol may be enabled or disabled (operation 504) by interacting with a button, switch, and/or peripheral device provided by the physically operated mechanism. For example, a user may enable detection of the storage device by pressing the button, toggling the switch, and/or physically connecting the peripheral device to the storage device. If detection of the storage device is not enabled, wireless peer-to-peer file transfer between the storage device and computer system is not performed.

If detection of the storage device is enabled, the physically operated mechanism is used to establish a wireless peer-to-peer connection between the storage device and the computer system (operation 506). For example, the physically operated mechanism may include a radio that enables detection of the storage device by advertising a file-transfer capability to the computer system using the discovery protocol, as well as the subsequent establishment of the wireless peer-to-peer connection between the storage device and computer system.

The wireless peer-to-peer connection is also used to transfer a file between the storage device and the computer system (operation 508). For example, a user may transfer a file from the storage device to the computer system by dragging a file on the storage device to a name and/or icon for the computer system (e.g., using an AirDrop interface). Similarly, the user may transfer a file from the computer system to the storage device by dragging a file on the computer system to a name and/or icon for the storage device. The dragged file may trigger a request to transfer the file that is sent to the storage device and/or computer system. Upon receiving the request, the storage device and/or computer system may establish the wireless peer-to-peer connection and use the wireless peer-to-peer connection to transfer the file.

Alternatively, a infrastructure connection between the storage device and computer system may be more robust (operation 510) than the wireless peer-to-peer connection. If the infrastructure connection is preferable to (e.g., has higher signal strength and/or bandwidth than) the wireless peer-to-peer connection, the infrastructure connection is used to transfer some or all of the file (operation 512). On the other hand, the wireless peer-to-peer connection may continue to be used to transfer the file (operation 508) if the infrastructure connection is unavailable and/or less robust than the wireless peer-to-peer connection.

Transfer of the file between the storage device and the computer system may continue (operations 508-512) until the transfer is complete (operation 514). The physically operated mechanism may then be used to enable subsequent wireless peer-to-peer file transfers between the storage device and one or more computer systems (operations 504-514), or detection of the storage device may be disabled after the peer-to-peer file transfer functionality of the physically operated mechanism is no longer needed.

Figure 6:
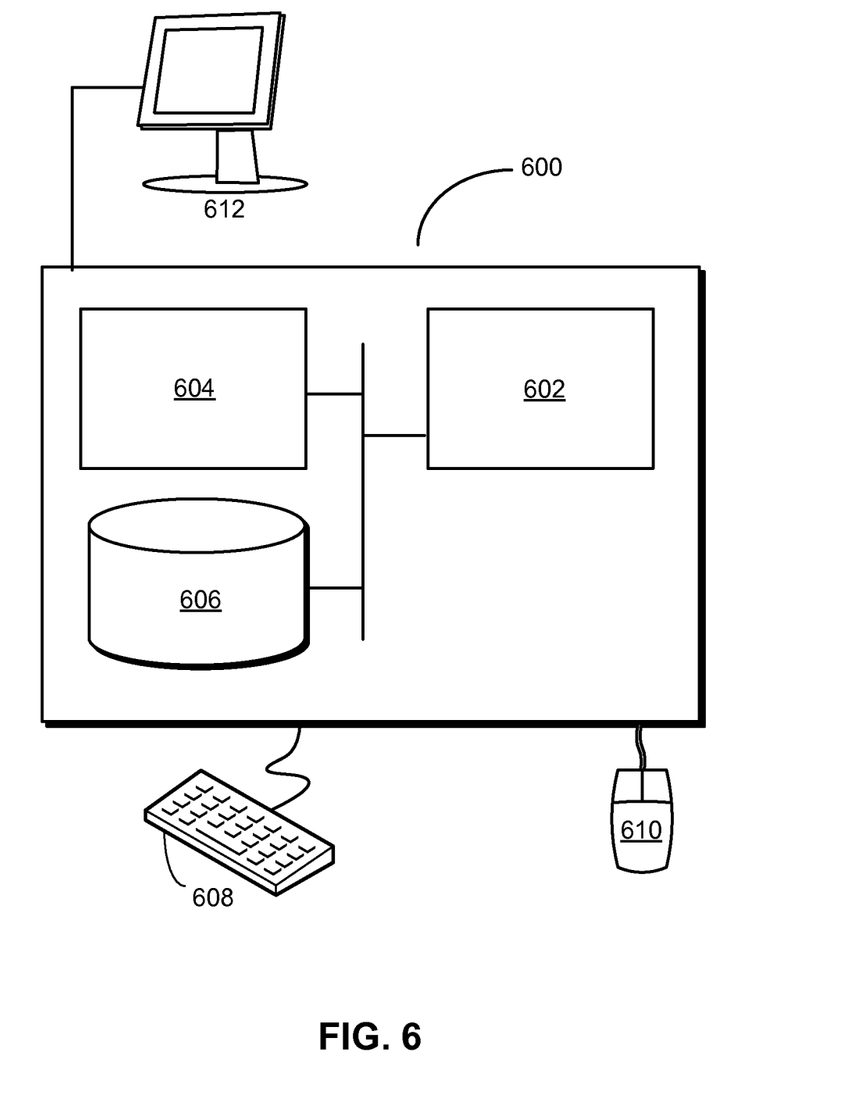
FIG. 6 shows a computer system in accordance with the disclosed embodiments.

FIG. 6 shows a computer system 600 in accordance with the disclosed embodiments. Computer system 600 may correspond to an apparatus that includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating communication with a storage device. The system may include a discovery apparatus that enables detection of the storage device in proximity to a computer system using a discovery protocol. The system may also include a communication apparatus that establishes a wireless peer-to-peer connection between the storage device and the computer system if detection of the storage device using the discovery protocol is enabled. The communication apparatus may then use the wireless peer-to-peer connection to transfer a file between the storage device and the computer system.

In addition, one or more components of computer system 600 may be remotely located and connected to the other components over a network. Portions of the present embodiments (e.g., discovery apparatus, communication apparatus, storage device, computer system, etc.) may also be located on different nodes of a distributed system that implements the embodiments. For example, the present embodiments may be implemented using a number of storage devices connected to a number of computer systems using a set of peer-to-peer and/or infrastructure connections.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating communication with a storage device, comprising:
based on a connection of a physically operated mechanism to a communication port of the storage device, enabling, by the physically operated mechanism, the detection of the storage device by a computer system in proximity to the storage device using a discovery protocol; and
based on the enablement of the detection of the storage device by the physically operated mechanism:
establishing a wireless peer-to-peer connection between the storage device and the computer system; and using the wireless peer-to-peer connection to transfer a file between the storage device and the computer system.

2. The computer-implemented method of claim 1, further comprising:
using an infrastructure connection to transfer the file between the storage device and the computer system if the infrastructure connection is more robust than the wireless peer-to-peer connection.

3. The computer-implemented method of claim 1, wherein the physically operated mechanism comprises:
a peripheral device separate from the storage device.

4. The computer-implemented method of claim 1, wherein the physically operated mechanism comprises at least one of:
a radio;
a processor; and
a memory.

5. The computer-implemented method of claim 1, wherein enabling detection of the storage device by the computer system using the discovery protocol involves:
by the physically operated mechanism, advertising a file-transfer capability of the storage device using the discovery protocol.

6. The computer-implemented method of claim 1, wherein the storage device is at least one of an internal hard disk drive (HDD), an external HDD, a thumb drive, and a memory card.

7. The computer-implemented method of claim 1, wherein the wireless peer-to-peer connection is initiated upon receiving a request to transfer the file.

8. A system for facilitating communication with a storage device, comprising:
a physically operated mechanism configured to be connected to a communication port of the storage device, the connecting causing the physically operated mechanism to enable the detection of the storage device by a computer system in proximity to the storage device using a discovery protocol; and
a communication apparatus in the physically operated mechanism configured to:
based on the enablement of the detection of the storage device by the physically operated mechanism, establish a wireless peer-to-peer connection between the storage device and the computer system; and
use the wireless peer-to-peer connection to transfer a file between the storage device and the computer system.

9. The system of claim 8, wherein the communication apparatus is further configured to:
use an infrastructure connection to transfer the file between the storage device and the computer system if the infrastructure connection is more robust than the wireless peer-to-peer connection.

10. The system of claim 8, wherein the physically operated mechanism comprises:
a peripheral device separate from the storage device.

11. The system of claim 8, wherein enabling detection of the storage device by the computer system using the discovery protocol involves:
advertising a file-transfer capability of the storage device using the discovery protocol.

12. The system of claim 8, wherein the storage device is at least one of an internal hard disk drive (HDD), an external HDD, a thumb drive, and a memory card.

13. The system of claim 8, wherein the wireless peer-to-peer connection is initiated upon receiving a request to transfer the file.

14. A computer-readable storage medium storing instructions that, when executed by a physically operated mechanism, cause the physically operated mechanism to perform a method for facilitating communication with a storage device, the method comprising:
based on a connection of the physically operated mechanism to a communication port of the storage device, enabling, by the physically operated mechanism, the detection of the storage device by a computer system in proximity to the storage device using a discovery protocol; and
based on the enablement of the detection of the storage device by the physically operated mechanism:
establishing a wireless peer-to-peer connection between the storage device and the computer system; and
using the wireless peer-to-peer connection to transfer a file between the storage device and the computer system.

15. The computer-readable storage medium of claim 14, the method further comprising:
using an infrastructure connection to transfer the file between the storage device and the computer system if the infrastructure connection is more robust than the wireless peer-to-peer connection.

16. The computer-readable storage medium of claim 14, wherein the physically operated mechanism comprises:
a peripheral device separate from the storage device.

17. The computer-readable storage medium of claim 14, wherein the physically operated mechanism comprises at least one of:
a radio;
a processor; and
a memory.

18. The computer-readable storage medium of claim 14, wherein enabling detection of the storage device by the computer system using the discovery protocol involves:
by the physically operated mechanism, advertising a file-transfer capability of the storage device using the discovery protocol.

19. The computer-readable storage medium of claim 14, wherein the storage device is at least one of an internal hard disk drive (HDD), an external HDD, a thumb drive, and a memory card.

* * * * *